United States Patent [19]

Nakajima et al.

[11] Patent Number: 4,829,126

[45] Date of Patent: May 9, 1989

[54] HIGH WATER-ABSORPTIVE SOFT CONTACT LENS

[75] Inventors: Tatsutoshi Nakajima, Kasugai; Nobuyuki Toyoshima, Nagoya; Masashige Yamanaka, Kuwana, all of Japan

[73] Assignee: Toyo Contact Lens Co., Ltd., Aichi, Japan

[21] Appl. No.: 37,069

[22] Filed: Apr. 13, 1987

Related U.S. Application Data

[63] Continuation of Ser. No. 815,595, Jan. 2, 1986, abandoned.

[30] Foreign Application Priority Data

Jan. 9, 1985 [JP] Japan .................................. 60-1762

[51] Int. Cl.$^4$ ............................................ C08F 271/02
[52] U.S. Cl. ..................................... 525/283; 525/296
[58] Field of Search ................. 526/264, 273, 303.1; 525/283, 296

[56] References Cited

U.S. PATENT DOCUMENTS

| Re. 31,422 | 10/1983 | Loshaek et al. | 526/264 |
|---|---|---|---|
| 3,532,679 | 10/1970 | Steckler | 526/264 |
| 3,700,761 | 10/1972 | O'Driscoll et al. | 525/283 |
| 3,949,021 | 4/1976 | Kunitomo et al. | 524/46 |
| 4,018,853 | 4/1977 | La Baeuf et al. | 525/283 |
| 4,022,754 | 5/1977 | Howes et al. | 526/264 |
| 4,038,264 | 7/1977 | Rostoker et al. | 526/264 |
| 4,123,407 | 10/1978 | Gordon | 526/264 |
| 4,182,802 | 1/1980 | Loshaek et al. | 526/264 |
| 4,184,992 | 1/1980 | Hosaka | 526/273 |
| 4,267,295 | 5/1981 | Gallop et al. | 526/273 |
| 4,347,198 | 8/1982 | Ohkada . | |
| 4,361,657 | 11/1982 | Atkinson et al. | 523/106 |
| 4,430,458 | 2/1984 | Tighe et al. | 526/264 |
| 4,433,111 | 2/1984 | Tighe et al. | 526/264 |
| 4,436,887 | 3/1984 | Chromecek et al. | 523/108 |
| 4,440,919 | 4/1984 | Chromecek et al. | 523/108 |
| 4,451,629 | 5/1984 | Tanaka et al. | 523/106 |

FOREIGN PATENT DOCUMENTS

| 0129840 | 1/1985 | European Pat. Off. . | |
|---|---|---|---|
| 0188110 | 7/1986 | European Pat. Off. . | |
| 3434137 | 3/1986 | Fed. Rep. of Germany | 526/264 |
| 2402525 | 4/1979 | France . | |
| 2463795 | 2/1981 | France . | |
| 61-141717 | 6/1986 | Japan | 525/283 |

*Primary Examiner*—Joseph L. Schofer
*Assistant Examiner*—N. Sarafim
*Attorney, Agent, or Firm*—Armstrong, Nikaido Marmelstein & Kubovcik

[57] ABSTRACT

A highly water-absorptive soft contact lens made of a copolymer comprising (A) 10 to 40 parts by weight of an acrylate or methacrylate polymer having a hydrophilic group and at least one polymerizable group in its molecule and (B) 90 to 60 parts by weight of a hydrophilic monomer selected from the group consisting of a N-vinyllactam, acrylamide, N-substituted acrylamide derivative, methacrylamide and N-substituted methacrylamide derivative;

the total amount of the components (A) and (B) being 100 parts by weight. The soft contact lens has a high water content, excellent oxygen permeability, transparency and excellent physical properties.

5 Claims, No Drawings

HIGH WATER-ABSORPTIVE SOFT CONTACT LENS

This application is a continuation of application Ser. No. 815,595 filed on Jan. 2, 1986.

BACKGROUND OF THE INVENTION

The present invention relates to a novel, highly water-absorptive soft contact lens, and more particularly to a high water-absorptive soft contact lens made of a copolymer prepared by copolymerizing an acrylate polymer or a methacrylate polymer (hereinafter referred to as "(meth)acrylate polymer") having hydrophilic groups and at least one polymerizable group and hydrophilic monomers as main components.

It has been well-known that among various materials for contact lens use, a material which swells and softens as a result of absorbing water, is preferred for obtaining a soft contact lens which is confortable to wear.

Material mainly composed of polyhydroxyalkyl methacrylate, polyvinylpyrrolidone, or the like has been used in the above mentioned materials. The material mainly composed of polyvinylpyrrolidone is excellent in water-absorptive property and gas-permeability, and has a high safety for eyes from the physiological point of view because oxygen physiologically required for the cornea is supplied enough from the open air to the cornea through water impregnated in a contact lens.

The material mainly composed of polyvinylpyrrolidone has excellent properties as mentioned above. However, because it has a high water content, it shows remarkable deterioration of dynamical properties when it is swollen with water, and consequently, it has a problem in durability, being easily damaged when formed into a lens.

In order to solve the above mentioned problems in durability, disclosed in Japanese Examined Patent Publication No. 43085/1982 is a method to produce a comb-type block polymer by introducing suitably a side chain having a size within a certain range of polymethyl methacrylate into the main chain of a hydrophilic polymer, thereby improving mechanical strength, while maintaining the preferable nature of the hydrophilic polymer.

However, the polymethyl methacrylate having a polymerizable group in one end of the molecule which is disclosed in above mentioned publication has the disadvantages in productivity. That is to say, it is difficult to control the reaction so as to produce only the polymethyl methacrylate in good efficiency in the industrial production thereof, particularly in large quantities, a mixture of a polymethyl methacrylate having a polymerizable grou in the molecular chain end and a polymethyl methacrylate not having a polymerizable group is apt to be produced. Accordingly, when a hydrophilic monomer is copolymerized with the polymethyl methacrylate, the produced comb-type block copolymer contains the polymethyl methacrylate not copolymerized with the hydrophilic monomer, thus the devitrification-phenomena may appear when the copolymer impregnated with water and the yield of the copolymer having good qualities is decreased.

The water content of the material mainly composed of polyhydroxyalkyl methacrylate is about 30 to 40% by weight, and therefore, this material is superior in the dynamical properties to the material mainly composed of polyvinylpyrrolidone. However, it has such problems that the water content is low and oxygen required for the cornea is not sufficiently supplied from the open air to the cornea through water impregnated in a contact lens.

The present invention is accomplished in order to obtain a highly water-absorptive soft contact lens which does not suffer remarkable deterioration of dynamical properties when it is swollen with water and which is excellent in transparency.

SUMMARY OF THE INVENTION

In accordance with the present invention, there is provided a highly water-absorptive soft contact lens made of a copolymer comprising (A) 10 to 40 parts by weight of (meth)acrylate polymer having a hydrophilic group and at least one polymerizable group in its molecule and (B) 90 to 60 parts by weight of a hydrophilic monomer selected from the group consisting of an N-vinyllactam, acrylamide, N-substituted acrylamide derivative, methacrylamide and N-substituted methacrylamide derivative; the total amount of the components (A) and (B) being 100 parts by weight.

In the present invention, there can be obtained a highly water-absorptive soft contact lens excellent in transparency because the above mentioned (meth)acrylate polymer, that is is a reinforcing material, has a hydrophilic group and at least one polymerizable group in the molecule, and is suitably copolymerized with the above mentioned hydrophilic monomers, and moreover, the copolymer is not formed in phase separation structure.

DETAILED DESCRIPTION

In the present invention, a (meth)acrylate polymer having a hydrophilic group and at least one polymerizable group in the molecule is a component in order to reinforce the formed copolymer without remarkable deterioration of strength and devitrification-phenomena when the hydrophilic polymer which is derived from a hydrophilic monomer selected from the group consisting of an N-vinyllactam, acrylamide, N-substituted acrylamide derivative, methacrylamide and N-substituted methacrylamide derivative is impregnated with water. The hydrophilic group and at least one polymerizable group are introduced into the (meth)acrylate polymer in order to reinforce the copolymer effectively without causing the devitrification-phenomena.

The (meth)acrylate polymer is prepared, for instance, by copolymerizing an alkyl (meth)acrylate monomer (a) which is used in order to form the skeleton of the polymer, a (meth)acrylic monomer having a hydrophilic group (b) which is used in order to introduce a hydrophilic group into the molecule of the polymer and a monomer having at least two polymerizable groups (c) which is used in order to introduce at least one polymerizable group into the molecule of the polymer.

The alkyl (meth)acrylate monomer (a), the (meth)acrylate monomer having a hydrophilic group (b) and the monomer having at least two polymerizable groups are explained below.

The alkyl (meth)acrylate monomer (a) is one having a linear, branched or cyclic alkyl group, which may be substituted with a halogen atom such as fluorine atom. Representative examples of the alkyl (meth)acrylate monomer (a) are, for instance, methyl (meth)acrylate, ethyl (meth)acrylate, propyl (meth)acrylate, butyl (meth)acrylate, pentyl (meth)acrylate, hexyl (meth)a- crylate, dodecyl (meth)acrylate, cyclohexyl (meth)acrylate, trifluoroethyl (meth)acrylate, pentafluoroethyl meth(acrylate), and the like. The alkyl (meth)acrylate monomers may be employed alone or in admixture thereof.

The (meth)acrylic monomer having a hydrophilic group (b) is one having a hydrophilic group such as hydroxyl, polyalkylene glycol residue, carboxyl, amide, an N-substituted amide, amino or an N-substituted amino group.

Representative examples of the (meth)acrylic monomer having a hydrophilic group (b) are, for instance, a (meth)acrylate having a hydroxyl group such as hydroxyethyl (meth)acrylate, hydroxypropyl (meth)acrylate, hydroxybutyl (meth)acrylate, dihydroxypropyl (meth)acrylate, dihydroxypropyl (meth)acrylate, dihydroxybutyl (meth)acrylate, diethylene glycol mono(meth)acrylate, triethylene glycol mono(meth)acrylate or dipropylene glycol mono(meth)acrylate; (meth)acrylic acid; (meth)acrylanide; a N-monosubstituted (meth)acrylamide such as N-methyl (meth)acrylamide, N-ethyl (meth)acrylamide or N-hydroxyethyl (meth)acrylamide; a N,N-disubstituted (meth)acrylamide such as N,N-dimethyl (meth)acrylamide, N,N-diethyl (meth)acrylamide or N-ethyl-N-aminoethyl (meth)acrylamide; a (meth)acryloyloxyalkyl amine such as (meth)acryloyloxyethyl amine; a N-monosubstituted (meth)acryloyloxyalkyl amine such as N-methyl (meth)aryloyloxyethyl amine; a N,N-disubstituted alkylamine such as N,N-dimethyl (meth)acryloyloxyethylamine; a N-vinyl lactam such as N-vinylpyrrolidone; and the like. Also, a ketalized dihydroxyalkyl (meth)acrylate in which 2 hydroxyl groups are ketalized such as 2,3-o-isopropylidene glycerol (meth)acrylate, 2-methyl-2-ethyl-4-(meth)acryloxymethyl-1,3-dioxolane or methyl-2,3-o-isopropylidene glycerol, can be employed in the invention as the monomer (b) to obtain substantially the same effects as those produced by the above-mentioned monomers. In that case, the ketal group is eliminated to produce hydroxyl groups by acid treatment after the polymerization. These monomers (b) may be employed alone or in admixture thereof.

Representative exmaples of the monomer having two polymerizable groups (c) are, for instance, ethylene glycol di(meth)acrylate, allyl (meth)acrylate, vinyl (meth)acrylate, diethylene glycol di(meth)acrylate, triethylene glycol di(meth)acrylate, propylene glycol di(meth)acrylate, dipropylene glycol di(meth)acrylate, and the like. These monomers (c) may be employed alone or in admixture thereof.

When the (meth)acrylate polymer having a hydrophilic group and at least one polymerizable group in the molecule (A) used in the present invention is prepared, a lower alkyl (meth)acrylate is preferably used as a component of the alkyl (meth)acrylate monomer in order to make the copolymerization of the (meth)acrylate polymer (A) and the hydrophilic monomer selected from the group consisting of a N-vinyllactam, acrylamide, N-substituted acrylamide derivative, methacrylamide and N-substituted methacrylamide derivative good without causing steric hindrance. Also, since the copolymerizability is different between the vinyl group and (meth)acryloyl group or between the allyl group and (meth)acryloyl group, it is preferable to select the monomer (c) in consideration of the copolymerizability between the polymerizable group of the polymer (A) and the polymerizable group of the hydrophilic monomer (B).

For instance, when the N-vinyllactam is employed as the hydrophilic monomer (B), it is preferable that a (meth)acrylate monomer having a vinyl group such as allyl (meth)acrylate or vinyl (meth)acrylate is employed as the component (c). When the (meth)acrylamide in which the hydrogen atom bonded to the nitrogen atom may be substituted is employed as the hydrophilic monomer (B), it is preferable that a (meth)acrylate monomer having a (meth)acryloyl grop such as ethylene glycol di(meth)acrylate or diethylene glycol di(meth)acrylate is employed as the component (c). When the N-vinyllactam and the (meth)acrylamide in which the hydrogen atom bonded to the nitrogen atom may be substituted are employed at the same time, it is preferable that the (meth)acrylate monomer having a vinyl group and the (meth)acrylate monomer having a (meth)acryloyl group are employed at the same time.

The (meth)acrylate polymer having a hydrophilic group and at least one polymerizable group in its molecule (A) used in the present invention can be obtained by copolymerizing the monomers (a), (b) and (c). However, it is necessary to control the copolymerization condition so that all the polymerizable groups in the monomer (c), which is employed in order to introduce polymerizable groups into the obtained copolymer, do not participate in the polymerization, in other words, that a cross-linking reaction does not occur, at the time when the monomers (a), (b) and (c) are copolymerized. Therefore, a solution polymerization is preferably employed as a polymerization method.

Any solvents can be used in the above solution polymerization, so long as they dissolve the monomer and polymer well and do not hinder the polymerization. For instance, benzene, acetone and the like can be used and may be employed alone or in admixture thereof. The amount of the solvent varies depending on the polymerization conditions. A suitable amount of the solvent is employed.

The polymerization reaction condition cannot be wholly determined because there is correlation between the reaction temperature and reaction time. Therefore, it is practically preferable that the copolymerization reaction is carried out at comparatively low temperatures, e.g. at a temperature of 50° to 80° C., for several minutes to several hours.

When polymerizing the monomers (a), (b) and (c), usual polymerization initiators such as azobisisobutyronitrile, azobisdimethyl valeronitrile, t-butyl hydroperoxide, cumene hydroperoxide and benzoyl peroxide can be employed. The amount of the polymerization initiator is from about 0.001 to about 5 parts by weight, preferably, from about 0.01 to about 2 parts by weight based on the 100 parts by weight of all of the monomers used in the polymerization.

It is possible to control the composition of the (meth)acrylate polymer (A), that is, it is possible to control the numbers of polymerizable groups and hydrophilic groups in the polymer (A) by adjusting the amount of each of the monomers (a), (b) and (c) when preparing the (meth)acrylate polymer (A) used in the present invention.

For giving the excellent reinforcing effect, it is preferable that the proportion of the monomer (c) used to introduce polymerizable groups is about 0.2 to about 5% by mole based on the total amount of the monomers used and the proportion of the monomer (b) used to introduce hydrophilic groups is about 1 to about 30% by mole based on the total amount of the monomers used.

Regarding the proportion of the monomer (c) as the number of polymerizable groups, it is necessary that the number of polymerizable groups is at least one in one (meth)acrylate polymer molecule for giving the reinforcing effect. In case that the number average molecular weight is 10,000 to 50,000, it is preferable that the number of polymerizable groups is at most about 5. When the number of polymerizable groups is more than the above range it is hard to obtain the preferable copolymer having high water content because the cross-linking density of the copolymer prepared by copolymerizing the (meth)acrylate polymer (A) with the hydrophilic monomer (B) rises too high, thus resulting in lowering of the water content of the obtained copolymer.

On the other hand, in case that the proportion of the hydrophilic groups in the (meth)acrylate polymer (A) is less than the above range, the devitrication-phenomena occurs in the obtained contact lens when the lens is impregnated with water, and in case that the proportion of the hydrophilic groups in the (meth)acrylate polymer (A) is more than the above range, the (meth)acrylate polymer (A) cannot have the sufficient reinforcing effect.

An example of the (meth)acrylate polymer (A) used in the invention is, for instance, a compound having the formula (I):

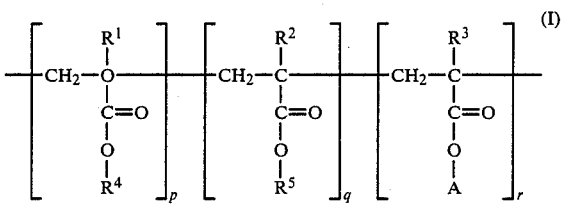

wherein $R^1$, $R^2$ and $R^3$ are the same or different and each is hydrogen atom or methyl group, $R^4$ is an alkyl group having 1 to 4 carbon atoms, $R^5$ is an alkyl group having a hydroxyl group, A is a polymerizable group such as $CH_2=C(CH_3)(CH_2)_2-$ or $CH_2=CH-CH_2-$, and p, q and r are integers to show a contaminating ratio of hydrophilic groups and polymerizable groups satisfying the formula:

$$0.01 \leq \frac{q}{p+q+r} \leq 0.3 \text{ and}$$

$$0.002 \leq \frac{r}{p+q+r} \leq 0.05$$

The monomers (a), (b) and (c) are employed in the above-mentioned method for preparing the (meth)acrylate polymer (A). However, the (meth)acrylate polymer (A) can be synthesized by the following methods which are the methods for introducing a polymerizable groups into the copolymer without employing the monomer (c).

1. A (meth)acrylate having an epoxy group such as glycidyl (meth)acrylate is copolymerized with the monomer (a) and (b), and then the polymerizable group is introduced into the copolymer by the reaction of the obtained copolymer and a compound which reacts with epoxy group such as methacrylic acid or hydroxystyrene.

2. The monomers (a) and (b) and an alkyl (meth)acrylate having a hydroxyl group are copolymerized, and then the obtained copolymer is reacted with a predetermined amount of an acid halide having a polymerizable group such as (meth)acryloyl chloride to introduce polymerizable groups into the copolymer. As the alkyl (meth)acrylate having hydroxyl group, there are used those exemplified for the monomer (b).

3. (Meth)acrylic acid is copolymerized with the monomers (a) and (b), and then a polymerizable group is introduced into the copolymer by the reaction of the obtained copolymer and a compound having epoxy group and polymerizable group such as glycidyl (meth)acrylate.

In the above-mentioned processes 1 to 3, the reaction is carried out in two stages, but the before-mentioned process in which the monomers (a), (b) and (c) are copolymerized, is preferable from the view point of obtaining the (meth)acrylate polymer (A) in high industrial productivity, since the (meth)acrylate polymer (A) can be obtained in one stage reaction.

The thus synthesized (meth)acrylate polymer (A) is colorless and transparent in the form of a solution thereof in a solvent and is a white powder in the dry state. According to a gel permeation chromatography (hereinafter referred to as "GPC") using a polystyrene calibration curve, the number average molecular weight ($\overline{M}n$) of the (meth)acrylate polymer (A) is from about 5,000 to about 100,000. The molecular weight of the (meth)arylate polymer (A) influences the dynamical properties of an obtained high water-absorptive soft contact lens and the larger the molecular weight is, the better the dynamical properties become. However, when the molecular weight is too large, it is difficult to obtain a homogeneous copolymer because the (meth)acrylate polymer (A) and the hydrophilic monomer (B) such as N,N-dimethyl (meth)acrylamide or N-vinyl-2-pyrrolidone are not uniformly admixed upon the copolymerization. Therefore, the preferable range of the number average molecular weight is from about 10,000 to about 50,000.

The copolymer employed in the soft contact lens of the present invention is prepared by copolymerizing the thus obtained (meth)acrylate polymer (A) and the hydrophilic monomer (B) selected from the group consisting of a N-vinyllactam, acrylamide, N-substituted acrylamide derivative, methacrylamide and N-substituted methacrylamide derivative.

Examples of the N-vinyllactams are, for instance, N-vinylpyrrolidone, N-vinylpiperidone, N-vinylcaprolactam, and their derivatives in which the lactam ring has at least one lower alkyl substituent having 1 to 4 carbon atoms. However, these N-vinyllactams are not limited to the exemplified ones. Other compounds having similar properties to those of the above-mentioned N-vinyllactams, namely those having polymerizing groups and giving hydrophilic properties to the produced copolymer, can be used in the invention as well as the N-vinyllactam. Accordingly, the term "N-vinyllactam" as used herein means the above mentioned N-vinyllactam and the compounds having similar properties e.g. N-vinyl heterocyclic compounds such as α-methylene-N-methylpyrrolidone. These compounds may be employed together with or instead of N-vinyllactams.

Examples of the above-mentioned (meth)acrylamide in which hydrogen atoms attached to the nitrogen atom may be substituted are, for instance, (meth)acrylamide, N-methyl (meth)acrylamide, N-ethyl (meth)acrylamide, N-hydroxyethyl (meth)acrylamide, N,N-dimethyl (meth)acrylamide, N,N-diethyl (meth)acrylamide, N-ethyl-N-aminoethyl (meth)acrylamide, and the like, but these (meth)acrylamides are not limited to the exemplified ones.

These hydrophilic monomers may be employed alone or in admixture thereof.

The proportion of the hydrophilic monomer (B) and the (meth)acrylate polymer (A) is about 90: about 10 to about 60: about 40 by weight, preferably about 85: about 15 to about 70: about 30.

The (meth)acrylate polymer (A) is used to reinforce the resulting copolymer prepared by copolymerization of the (meth)acrylate polymer (A) and the hydrophilic monomer (B). It is necessary that the amount of the (meth)acrylate polymer (A) is not less than 10 parts by weight based on 100 parts by weight of the total of the (meth)acrylate polymer (A) and the hydrophilic monomer (B). On the other hand, it is necessary that the amount is not more than 40 parts by weight based on 100 parts by weight of the total of the (meth)acrylate polymer (A) and the hydrophilic monomers (B) for maintaining high water-absorptive property of the soft contact lens.

When the highly water-absorptive soft contact lens of the invention is prepared, as occasion demands, usual hydrophilic monomers such as (meth)acrylic acid, hydroxyethyl (meth)acrylate, dihydroxypropyl (meth)acrylate and alkoxypolyethylene glycol mono(meth)acrylate may be employed instead of part of the above-mentioned hydrophilic monomer (B). In such a case, it is preferable that the amount of the above-mentioned usual hydrophilic monomers is not more than about 20 parts by weight based on 100 parts by weight of the total amount of the above-mentioned usual hydrophilic monomers and the hydrophilic monomer (B) in order to maintain the water-absorptive property of the obtained copolymer high. Of course, the ratio of the hydrophilic monomer and the (meth)acrylate polymer (A) should be within the above-mentioned range.

Moreover, it is possible that hydrophobic monomers such as methyl (meth)acrylate and styrene are admixed with the hydrophilic monomers, and a usual cross-linking agent such as ethylene glycol dimethacrylate or allyl methacrylate is employed from the view point of the compatibility.

When the copolymer used in the invention is prepared, a usual bulk polymerization process is preferably applicable for obtaining the soft contact lens of the invention in high productivity, and, if necessary, a solution polymerization process may be applied.

In both of the above-mentioned polymerization methods, it is preferable to employ a temperature-elevation method, e.g. a method in which the heat-polymerization is carried out at about 40° to about 50° C. for several hours to several tens of hours, and then polymerization is completed by heating at a rate of about 10° C./several hours.

The amount of the polymerization initiator employed in the preparation of the (meth)acrylate polymer (A) is about 0.001 to about 5 parts by weight, preferably about 0.01 to about 2 parts by weight based on 100 parts by weight of the whole amounts of the polymerizable monomers.

The highly water-absorptive soft contact lens of the present invention can be prepared by methods such as conducting the (meth)acrylate polymer (A) and the hydrophilic monomer (B) into a mold corresponding to the predetermined shape of a contact lens to give a contact lens having the predetermined shape, or preparing a copolymer by copolymerizing the (meth)acrylate polymer (A) and the hydrophilic monomer (B) and processing the copolymer by a mechanical method such as cutting or polishing to give a contact lens shape, then impregnating the obtained copolymer with water to give the desired high water-absorptive property.

When employing the (meth)acrylate polymer having ketalized dihydroxyalkyl groups in its molecule, it is necessary that the contact lens is subjected to the deketalization, (a reaction wherein ketal groups are converted into hydroxyl groups) by employing usual acids after molding the contact lens, as described in Japanese Unexamined Patent Publication (Tokkyo Kokai) No. 176618/1983.

The present invention is more specifically described and explained by means of the following Examples in which all percents and parts are by weight unless otherwise noted. It is to be understood that the present invention is not limited to the Examples, and various changes and modifications may be made in the invention without departing from the spirit and scope thereof.

REFERENCE EXAMPLE 1

A three necked round bottom flask was charged with 7.5 g (5 parts) of 2-hydroxyethyl methacrylate, 142.5 g (95 parts) of methyl methacrylate, 0.93 g (0.62 part) of allyl methacrylate, 0.73 g (0.49 part) of ethylene glycol dimethacrylate, 2.0 g (1.3 parts) of azobisisobutyronitrile as a polymerization initiator and 600 ml of benzene as a solvent, and the polymerization reaction was carried out at a temperature of 70° C. for 1.5 hours with stirring. Then, the reaction mixture was poured into n-hexane to give a precipitate, and the obtained precipitate was dried under reduced pressure. The precipitate dissolved in benzene was poured into a large amount of n-hexane, and then it was reprecipitated, purified and dried under reduced pressure to give a (meth)acrylate polymer having a hydrophilic group and a polymerizable group in its molecule.

The molecular weight of the obtained (meth)acrylate polymer was measured according to the following method.

The results are shown in Table 1 with yields.

[Molecular weight]

The measurement of molecular weight is carried out by using a Trirotor III GPC analyzer (made by Japan Spectroscopic Co., Ltd.), (detector: Shodex RI SE-31 made by Showa Denko Kabushiki Kaisha; column: Shodex PAK GPC KF-804 made by Showa Denko Kabushiki Kaisha; medium: tetrahydrofuran) in conditions of a column temperature of 40° C. and a flow rate of 1.0 ml/min.

REFERENCE EXAMPLES 2 TO 14

The procedure of Reference Example 1 was repeated except that components and amounts shown in Table 1 were employed to prepare a (meth)acrylate polymer having a hydrophilic group and a polymerizable group in its molecule and a methyl (meth)acrylate polymer not having a hydrophilic group in its molecule, respectively. Molecular weights of the obtained (meth)acrylate polymers and methyl (meth)acrylate polymers were respectively measured in the same manner as in Reference Example 1.

The results are shown in Table 1 with yields.

TABLE 1

| Components (parts) | Ref. Ex. 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| HEMA[1] | 5 | 5 | 5 | — | — | — | 10 | 15 | 15 | — | — | — | — | — |
| HBMA[2] | — | — | — | 5 | 5 | 5 | — | — | — | — | — | — | — | — |
| MAA[3] | — | — | — | — | — | — | — | — | — | 5 | — | 2.5 | 5 | — |
| DMAA[4] | — | — | — | — | — | — | — | — | — | — | — | — | — | 15 |
| MMA[5] | 95 | 95 | 95 | 95 | 95 | 95 | 90 | 85 | 85 | 95 | 100 | 97.5 | 95 | 85 |
| AMA[6] | 0.62 | 1.25 | 0.93 | 1.23 | 0.93 | 0.92 | 0.61 | 0.61 | — | — | 0.63 | 0.93 | 0.93 | 0.93 |
| EDMA[7] | 0.49 | 0.49 | 0.73 | 0.48 | 0.49 | 0.72 | 0.49 | 0.48 | 0.71 | 0.75 | 0.49 | 0.49 | 0.49 | 0.49 |
| AIBN[8] | 1.3 | 1.3 | 1.3 | 1.7 | 1.3 | 1.7 | 1.3 | 1.3 | 1.3 | 1.3 | 1.3 | 1.3 | 1.3 | 1.3 |
| $\overline{Mn}$ (× 10$^4$) | 3.0 | 3.0 | 3.0 | 3.0 | 3.1 | 3.2 | 2.8 | 2.8 | 3.3 | 3.1 | 3.0 | 2.5 | 2.6 | 2.4 |
| $\overline{Mw}/\overline{Mn}$ | 2.3 | 2.0 | 2.1 | 2.2 | 2.1 | 2.1 | 2.4 | 2.4 | 2.4 | 3.0 | 2.2 | 2.1 | 2.2 | 2.0 |
| Yield (%) | 50 | 40 | 45 | 40 | 40 | 45 | 50 | 50 | 30 | 47 | 45 | 46 | 46 | 43 |

(Note)
(1): 2-Hydroxyethyl methacrylate
(2): Hydroxybutyl methacrylate
(3): Methacrylic acid
(4): N,N-dimethyl acrylamide
(5): Methyl methacrylate
(6): Allyl methacrylate
(7): Ethylene glycol dimethacrylate
(8): Azobisisobutyronitrile
$\overline{Mn}$: Number average molecular weight
$\overline{Mw}$: Weight average molecular weight

EXAMPLES 1 TO 23 AND COMPARATIVE EXAMPLE 1

The hydrophilic monomer, (meth)acrylate polymer and polymerization initiator shown in Table 2 were admixed in amounts shown in Table 2 to give a mixture. In Examples 11 to 23, the obtained mixture was dried with anhydrous sodium sulfate overnight. A polypropylene test tube having an inside diameter of 18 mm was charged with the mixture and the polymerization was stepwise carried out at 35° C. for 40 hours, at 50° C. for 8 hours and then, the test tube was heated up to 110° C. at the rate of 10° C./90 min. After the product was taken out from the test tube and cured at 90° C. for 2 hours, the obtained rod was subjected to mechanical processing to give a lens. The obtained lens dipped with physiological saline solution was transparent, excellent in strength and flexible when it was impregnated with water.

The film of the copolymer which thickness was about 0.2 mm and a diameter was about 20 mm when impregnated with water, was processed from the rods, and the physical properties of the copolymer were measured by the following method.

The results are shown in Table 2.

[Appearance]
Appearance of equilibrium wet film is observed with the naked eyes.

[Water content]
Water content (%) is calculated on the basis of the following formula.

$$\text{Water content (\%)} = \frac{\text{(Weight of equilibrium wet film (g))} - \text{(Weight of dry film (g))}}{\text{Weight of equilibrium wet film (g)}} \times 100$$

[Linear swelling ratio]
Linear swelling ratio (%) is calculated on the basis of the following formula.

$$\text{Linear swelling ratio (\%)} = \frac{\text{(Diameter of equilibrium wet film (mm))} - \text{(Diameter of dry film (mm))}}{\text{Diameter of dry film (mm)}} \times 100$$

[Needle penetration strength]
A pressure needle having a diameter of 1/16 inch is put on the center of the film impregnated with water (thickness: about 0.2 mm) and the weight (g) is measured at the time when the film is penetrated by employing an Instron compression tester.

[Elongation ratio]
Elongation ratio (%) of the film is measured at the time when needle penetration strength (g) is measured. The value shows the elongation at breaking.

[Strength index]
Strength index is calculated on basis of the following formula.

$$\text{Strength index} = \frac{\text{(Needle penetration strength (g))} \times \text{(Elongation ratio (\%))}}{2 \times \text{Thickness of the film (}\mu\text{m)}}$$

TABLE 2

| components (parts) | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| NVP | 39 | 15 | 39 | 15 | 19 | 39 | 56 | 56 | — | 19 | 18.5 | 19.5 |
| DMAA | 39 | 61 | 39 | 61 | 55 | 39 | 19 | 19 | 71 | 56 | 55.5 | 58.5 |
| MMA | — | — | — | — | — | — | — | — | — | — | — | — |
| EDMA | — | — | — | — | — | — | — | — | — | — | — | 0.3 |
| Polymer prepared in Ref. Ex. | | | | | | | | | | | | |
| 1 | 22 | — | — | — | — | — | — | — | — | — | — | — |
| 2 | — | 24 | — | — | — | — | — | — | — | — | — | — |
| 3 | — | — | 22 | — | — | — | — | — | — | — | — | — |
| 4 | — | — | — | 24 | — | — | — | — | — | — | — | — |
| 5 | — | — | — | — | 26 | — | — | — | — | — | — | — |
| 6 | — | — | — | — | — | 22 | — | — | — | — | — | — |

TABLE 2-continued

|  | | | | | | | | | | | | |
|---|---|---|---|---|---|---|---|---|---|---|---|---|
| 7 | — | — | — | — | — | — | 25 | — | — | — | — | — |
| 8 | — | — | — | — | — | — | — | 25 | — | — | — | — |
| 9 | — | — | — | — | — | — | — | — | 29 | — | — | — |
| 10 | — | — | — | — | — | — | — | — | — | 25 | — | — |
| 11 | — | — | — | — | — | — | — | — | — | — | — | — |
| 12 | — | — | — | — | — | — | — | — | — | — | — | — |
| 13 | — | — | — | — | — | — | — | — | — | — | 26 | 22 |
| 14 | — | — | — | — | — | — | — | — | — | — | — | — |
| V-65 | 0.05 | 0.03 | 0.05 | 0.03 | 0.03 | 0.05 | 0.07 | 0.07 | 0.03 | 0.03 | 0.02 | 0.02 |
| Anhydrous sodium sulfate | — | — | — | — | — | — | — | — | — | — | used | used |
| Physical properties | | | | | | | | | | | | |
| Appearance | trans-parent | trans-parent | trans-parent | trans-parent | trans-parent | trans-parent | trans-parent | trans-parent | trans-parent | trans-parent | trans-parent | trans-parent |
| Water content (%) | 80.1 | 79.1 | 78.0 | 78.4 | 79.9 | 77.0 | 76.8 | 79.6 | 79.6 | 79.2 | 78.7 | 78.5 |
| Linear swelling ratio (%) | 70.9 | 71.9 | 65.1 | 70.2 | 73.0 | 63.3 | 62.4 | 65.4 | 72.8 | 72.3 | 70.3 | 70.7 |
| Needle penetration strength (g) | 143 | 152 | 163 | 179 | 122 | 186 | 172 | 140 | 141 | 152 | 147 | 161 |
| Elongation ratio (%) | 67 | 61 | 61 | 65 | 69 | 59 | 58 | 59 | 61 | 55 | 57 | 60 |
| Strength index (g · %/μm) | 24.1 | 23.2 | 25.0 | 28.8 | 21.1 | 27.5 | 25.0 | 20.2 | 21.5 | 20.9 | 21 | 25 |

|  | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Com. Ex. 1 |
|---|---|---|---|---|---|---|---|---|---|---|---|---|
| components (parts) | | | | | | | | | | | | |
| NVP | 19.5 | 18.5 | 19.5 | 19.5 | 20.25 | 20.25 | 19.5 | 18.5 | 18.5 | 19.5 | 19.5 | 19 |
| DMAA | 58.5 | 55.5 | 58.5 | 58.5 | 60.75 | 60.75 | 58.5 | 58.5 | 55.5 | 58.5 | 58.5 | 56 |
| MMA | 15 | — | — | 15 | 3 | 15 | 3 | 15 | — | — | 15 | — |
| EDMA | 0.3 | — | 0.3 | 0.3 | 0.3 | 0.3 | 0.3 | 0.3 | — | 0.3 | 0.3 | — |
| Polymer prepared in Ref. Ex. | | | | | | | | | | | | |
| 1 | — | — | — | — | — | — | — | — | — | — | — | — |
| 2 | — | — | — | — | — | — | — | — | — | — | — | — |
| 3 | — | — | — | — | — | — | — | — | — | — | — | — |
| 4 | — | — | — | — | — | — | — | — | — | — | — | — |
| 5 | — | — | — | — | 19 | 19 | 22 | 22 | — | — | — | — |
| 6 | — | — | — | — | — | — | — | — | — | — | — | — |
| 7 | — | — | — | — | — | — | — | — | — | — | — | — |
| 8 | — | — | — | — | — | — | — | — | — | — | — | — |
| 9 | — | — | — | — | — | — | — | — | — | — | — | — |
| 10 | — | — | — | — | — | — | — | — | — | — | — | — |
| 11 | — | — | — | — | — | — | — | — | — | — | — | 25 |
| 12 | — | 26 | 22 | 22 | — | — | — | — | — | — | — | — |
| 13 | 22 | — | — | — | 26 | — | — | — | — | — | — | — |
| 14 | — | — | — | — | — | — | — | — | 26 | 22 | 22 | — |
| V-65 | 0.02 | 0.02 | 0.02 | 0.02 | 0.02 | 0.02 | 0.02 | 0.02 | 0.02 | 0.02 | 0.02 | 0.05 |
| Anhydrous sodium sulfate | used | used | used | used | used | used | used | used | used | used | used | |
| Physical properties | | | | | | | | | | | | |
| Appearance | trans-parent | trans-parent | trans-parent | trans-parent | trans-parent | trans-parent | trans-parent | trans-parent | trans-parent | trans-parent | trans-parent | cloudy |
| Water content (%) | 76.8 | 78.3 | 78.3 | 76.7 | 80.8 | 79.1 | 79.2 | 77.3 | 80.5 | 79.8 | 78.1 | 79.2 |
| Linear swelling ratio (%) | 67.7 | 69.7 | 70.6 | 66.4 | 76.7 | 72.5 | 70.2 | 66.5 | 75.2 | 73.7 | 69.6 | 71.1 |
| Needle penetration strength (g) | 174 | 159 | 132 | 178 | 117 | 115 | 114 | 151 | 142 | 126 | 148 | 166 |
| Elongation ratio (%) | 71 | 59 | 51 | 69 | 62 | 65 | 52 | 72 | 62 | 51 | 60 | 51 |
| Strength index (g · %/μm) | 32 | 24 | 17 | 32 | 18 | 19 | 15 | 27 | 22 | 16 | 23 | 22.4 |

COMPARATIVE EXAMPLE 2

The physical properties of a highly water absorptive soft contact lens prepared from commercially available N-vinylpyrrolidone as a main component were measured in the same manner as in Example 1.

The soft contact lens had a water content of 78.0% (a thickness: 0.2 mm), a needle penetration strength of 125 g, an elongation ratio of 64% and a strength index of 20.

From the above-mentioned results, although the high water absorptive soft contact lens of the present invention has high water content (water content: about 75 to 80%), it is confirmed that the contact lens is excellent in transparency and dynamical properties (mechanical strength or stability of shape when impregnated with water.

The highly water-absorptive soft contact lens of the present invention has the following advantages.

1. It is possible to be used for a long period of time, because the contact lens has high water content (about 70 to about 90%) and is excellent in oxygen permeability.

2. The remarkable lowered strength and lowered transparency (devitrification-phenomena) are not observed in the contact lens when the contact lens is impregnated with water, and therefore, the contact lens is excellent in transparency and physical properties.

What we claim is:

1. A highly water-absorptive soft contact lens comprising a copolymer made by copolymerizing (A) 10 to 40 parts by weight of an acrylate or methacrylate polymer prepared by copolymerizing (a) at least one alkyl acrylate or methacrylate, (b) at least one mono- or polyhydroxyalkyl acrylate or methacrylate, and (c) at least one acrylate or methacrylate ester having at least two polymerizable groups, and (B) 90 to 60 parts by weight of a hydrophilic monomer selected from the group consisting of a N-vinyllactam, acrylamide, N-substituted acrylamide derivative, methacrylamide and N-substituted methacrylamide derivative; the total amount of the components (A) and (B) being 100 parts by weight.

2. The soft contact lens of claim 1, wherein said N-substituted acrylamide derivative is a N-monosubstituted or N,N-disubstituted compound.

3. The soft contact lens of claim 1, wherein said N-substituted methacrylamide derivative is a N-monosubstituted or N,N-disubstituted compound.

4. The soft contact lens of claim 1, wherein said acrylate or methacrylate polymer has a number average molecular weight of 5,000 to 100,000.

5. The soft contact lens of claim 1, wherein said N-substituted acrylamide derivative is selected from the group consisting of N-methyl acrylamide, N-ethyl acrylamide, N-hydroxyethyl acrylamide, N,N-dimethyl acrylamide, N,N-diethyl acrylamide and N-ethyl-N-aminoethyl acrylamide, and said N-substituted methacrylamide derivative is selected from the group consisting of N-methyl methacrylamide, N-methyl methacrylamide, N-ethyl methacrylamide, N-hydroxyethyl methacrylamide, N,N-dimethyl methacrylamide, N,N-diethyl methacrylamide and N-ethyl-N-aminoethyl methacrylamide.

* * * * *